L. B. SWIFT.
THERMOMETER.
APPLICATION FILED MAR. 24, 1919.

1,356,175.

Patented Oct. 19, 1920.

Witnesses:
Edw. H. Cumpston
Nelson H. Copp

INVENTOR
Lewis B. Swift
BY
his ATTORNEYS

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

1,356,175.  Specification of Letters Patent.  Patented Oct. 19, 1920.

Application filed March 24, 1919. Serial No. 284,653.

*To all whom it may concern:*

Be it known that I, LEWIS B. SWIFT, of Rochester, in the county of Monroe and State of New York, have invented certain new and useful Improvements in Thermometers; and I do hereby declare the following to be a full, clear, and exact description of the same, reference being had to the accompanying drawings, forming a part of this specification, and to the reference numerals marked thereon.

This invention relates to temperature indicating devices and more particularly to devices of this character which are adapted for use in connection with industrial processes where it is desirable to have the indication made at a point considerably removed from the location or body, the temperature of which it is desired to ascertain. This condition of operation imposes difficulties incident to the use of some of the agencies commonly employed in devices of this character, which are overcome by the present invention, the main object of which is to provide an instrument of simple, economical and reliable construction, adapted to afford at a convenient point an accurate indication of the temperature at a point considerably removed. To these and other ends the invention consists in certain improvements and combinations of parts all as will be hereinafter more fully described, the novel features being pointed out in the claims at the end of the specification.

In the drawings.

Similar reference numerals in the several figures indicate the same parts.

Figure 1:
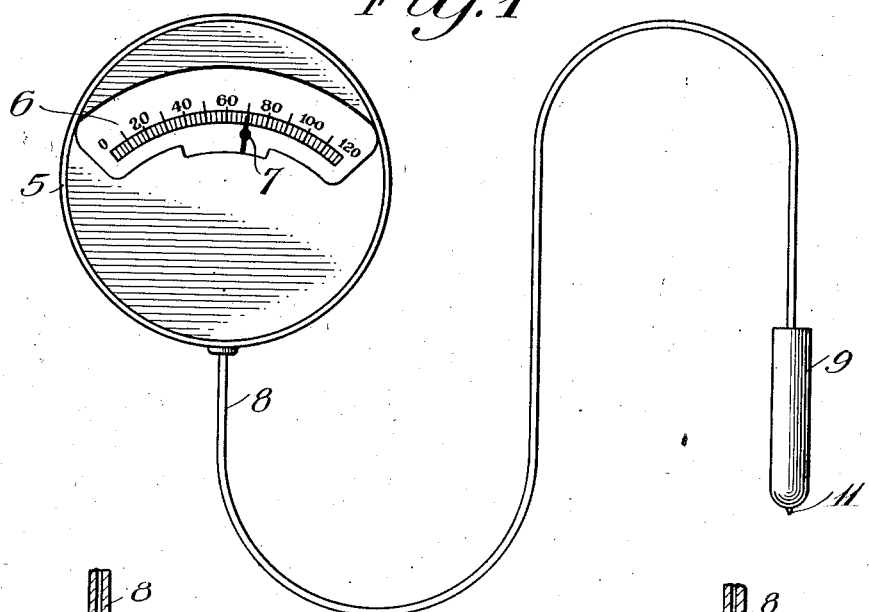
Figure 1 is an external view of the device as a whole.
Figure 2:
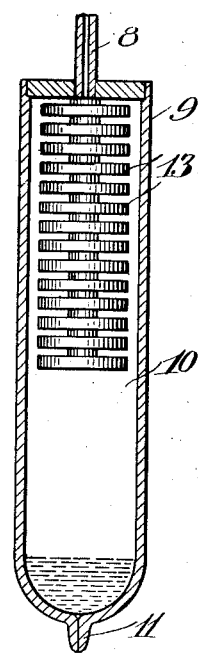
Fig. 2 is a central longitudinal section of the bulb.
Figure 3:
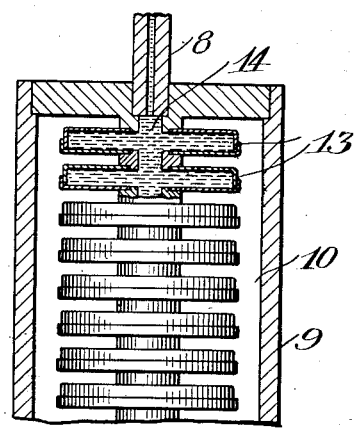
Fig. 3 is a similar view with parts broken away.

In the present embodiment of the invention which is now preferred as best illustrating the principles involved, there is shown an indicating device 5 having a scale 6 on which is marked a range of temperatures and an index or pointer 7 adapted to be actuated by varying pressures applied to the device to indicate corresponding temperatures. As this device may be of any suitable type and such as is well known in the art, a more detailed description is unnecessary.

Connected with the indicator 5 in the usual manner is a conduit 8, preferably of the capillary form of construction well known in the art, the other end of this conduit being connected with the bulb 9 which is subjected to the temperature to be ascertained.

Bulb 9 is preferably of substantially cylindrical form providing a chamber 10 adapted to contain a gas which will be later described, access to this chamber for the introduction of the gas being had through a nipple 11 or other similar means which is subsequently collapsed or otherwise closed to effectively seal the chamber. Within the chamber 10 is a flexible diaphragm or partition comprising preferably a series of communicating collapsible capsular parts 13 providing interiorly thereof a second chamber 14, these parts being secured to each other and to the top of the bulb where they communicate with the end of the capillary conduit, which together with the chamber 14 is filled with a suitable liquid.

Figure 4:
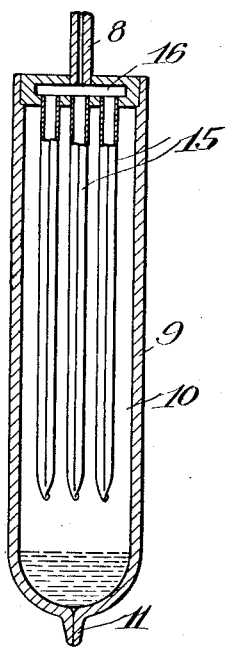
Fig. 4 is a view similar to Fig. 2 of a modified form of construction.

Fig. 4 shows a modified form of construction for the flexible partition comprising a series of collapsible tubes 15 communicating with each other at their upper ends through a passage 16 which in turn communicates with the capillary conduit.

It is apparent in both of these constructions that pressure exerted by the gas in chamber 10 will compress the capsular parts more or less depending on the degree of pressure, which is thus transmitted by the liquid contents of the second chamber 14, to the indicating device for indicating a temperature corresponding to the expansive action of the gas under the influence of heat.

Any suitable gas may be employed in the bulb. In the present instance the instrument shown is one which is adapted for indicating temperatures encountered in refrigerating processes and therefore it is preferred to employ sulfur dioxid, carbon dioxid or some similar gas which liquefies at a low temperature, or in other words at a temperature lower than that which is to be indicated. This gas is inserted through the nipple 11 preferably in the form of a liquid which volatilizes and fills chamber 10 with the gas. Chamber 14 and the conduit up to the diaphragm or other pressure member of the indicating device are filled with a suitable liquid, preferably one which is least sensitive to temperature changes, such for example, as glycerin.

Bulb 9 is placed in the body or space the temperature of which is to be ascertained, while the capillary conduit may have a length sufficient to enable the indicating device to be placed in some convenient locality removed at quite a distance. Changes of temperature cause the gas in chamber 10 to expand or contract, the variations in pressure being transmitted through the flexible partition and through the liquid to the indicating device, the latter being so calibrated as to accurately register the corresponding temperature. The liquid, being of a nature not materially suceptible to temperature changes, obviates the necessity for the correction of errors due to the effects which might otherwise result from such temperature changes on the connection between the bulb and the indicator. The device thus provides a convenient means for indicating temperature in industrial operations and is simple, reliable and accurate in operation.

I claim as my invention:

1. A thermometer comprising a container having two chambers therein separated by a flexible partition, a gas in one of said chambers, a temperature indicating device, a conduit between said device and the other of said chambers, and a liquid in said other chamber and conduit for transmitting the pressure exerted by said gas under the influence of heat to said device to actuate the latter and indicate the temperature to which said container is subjected.

2. A thermometer comprising a bulb separated by a flexible partition into two chambers one of which contains a gas, a device responsive to pressure to indicate a range of temperatures, a conduit connecting said device and the other of said chambers, and a liquid in said other chamber and conduit for transmitting the pressure exerted by said gas under the influence of heat through said partition to said device to indicate the temperature to which said bulb is subjected.

3. A thermometer comprising a bulb separated by a flexible partition into two chambers one of which contains a gas, a device responsive to pressure to indicate a range of temperatures, a capillary conduit connecting said device and the other of said chambers, and a liquid in said other chamber and conduit for transmitting the pressure exerted by said gas under the influence of heat through said partition to said device to indicate the temperature to which said bulb is subjected.

4. A thermometer for refrigerating temperatures comprising a sealed chamber containing a gas liquefying at a low temperature, a second chamber having a compressible portion subjected to the varying pressure exerted by said gas under variations of temperature, a pressure-responsive temperature indicating device, a capillary conduit connecting said second chamber and indicating device, and a liquid in said second chamber and conduit for transmitting the pressure exerted by said gas to said device for indicating the temperature to which said sealed chamber is subjected.

LEWIS B. SWIFT.